United States Patent
Daanen

(10) Patent No.: US 6,707,911 B1
(45) Date of Patent: Mar. 16, 2004

(54) METHOD FOR CANCELLING ECHOES IN A COMMUNICATION SYSTEM, A COMMUNICATION DEVICE, AND A RADIO BASE STATION OF A CORDLESS TELEPHONE DEVICE

(75) Inventor: Antonius M. J. Daanen, Zürich (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/240,571

(22) Filed: Jan. 29, 1999

(30) Foreign Application Priority Data

Jan. 30, 1998 (EP) .............................. 98200276

(51) Int. Cl.⁷ .............................................. H04M 9/08
(52) U.S. Cl. .................. 379/406.01; 455/462; 455/470; 370/286; 381/66; 381/71.1
(58) Field of Search ....................... 379/406.08, 406.06, 379/406.01; 341/147; 381/66, 71.11, 71.12; 370/290, 289, 287, 261, 286; 708/322; 455/569.1–570, 462–464, 502

(56) References Cited

U.S. PATENT DOCUMENTS

| | | | |
|---|---|---|---|
| 4,355,214 A | | 10/1982 | Levy et al. .............. 179/170.2 |
| 4,862,450 A | * | 8/1989 | Guidoux .................... 370/289 |
| 4,970,715 A | * | 11/1990 | McMahan .................. 370/287 |
| 5,200,751 A | * | 4/1993 | Smith ........................ 341/147 |
| 5,400,399 A | * | 3/1995 | Umemoto et al. ...... 379/406.08 |
| 5,612,996 A | * | 3/1997 | Li .......................... 379/406.06 |
| 5,794,152 A | * | 8/1998 | Hikuma et al. ............. 455/502 |
| 5,909,432 A | * | 6/1999 | Arends et al. .............. 370/261 |
| 6,181,794 B1 | * | 1/2001 | Park et al. ............. 379/406.08 |

OTHER PUBLICATIONS

By Philips Integrated Circuits Data Sheet, "PCA 1070, Multistandard Programmable Analog CMOS Transmission IC" Published in Mar. 6, 1996, pp. 2–9 & 28–29.

* cited by examiner

Primary Examiner—Xu Mei
Assistant Examiner—Con P. Tran
(74) Attorney, Agent, or Firm—Aaron Waxler

(57) ABSTRACT

The invention provides a method and a communication device for cancelling echoes in the communication device, comprising:
  receiving path means and sending path means for receiving and sending respective signals, and
  echo compensating means for generating an echo control signal which is representative of a perceived echo, which echo compensating means are coupled between the sending and the receiving path means, and comprise an echo digital control signal generating means, and a digital-to-analog convertor coupled to the digital control signal generating means and to the receiving path means. Hardware and software implementation are easy and the dynamic range of an analog-to-digital convertor present in the receiving path is limited.

9 Claims, 2 Drawing Sheets

METHOD FOR CANCELLING ECHOES IN A COMMUNICATION SYSTEM, A COMMUNICATION DEVICE, AND A RADIO BASE STATION OF A CORDLESS TELEPHONE DEVICE

BACKGROUND OF THE INVENTION

The present invention relates to a method for cancelling echoes in a communication system wherein respective signals are sent through a sending path and received through a receiving path, which method comprises the steps of supplying to the receiving path an echo control signal which is derived from the sending path and is representative of an echo to be cancelled in the receiving path.

The present invention also relates to a communication device and to a radio base station of a cordless telephone device.

DESCRIPTION OF RELATED ART

Such a method and communication device, for example, for a radio base station of a cordless telephone device, is applied in and known from Philips Integrated Circuits Data Sheet, entitled "PCA 1070, Multistandard Programmable Analog CMOS Transmission IC", specifying the PCA 1070 line interface features, and suitable for performing speech and line signal interface functions in electronic telephone sets. In particular the known communication device comprises an analog local-echo-cancelling means, generally also referred to as antisidetone (AST) means, for cancelling local echoes originating from its own local interface, mainly from the so-called hybrid circuit, which performs the separation and combination of respective signals in the sending and receiving paths, respectively, in order to couple a 4-wire telephone interface to the well known 2-wire a/b terminals of a telephone line.

In practise, the aforementioned interface is combined with a digital interface part wherein aside from analog local-echo-cancelling also digital local-echo-cancelling (LEC) is performed for cancelling echoes originating from the nearby interface itself. There is a strong tendency to cancel all kinds of echoes, irrespective of their source, to which the human ear is very sensitive and which may cause irritation and misunderstanding between parties trying to communicate with each other. In particular, echoes are more perceptible and thus more disturbing in present-day high-quality digital European cordless telephone (DECT) systems, due to the roundtrip delay of 20 msec.

SUMMARY OF THE INVENTION

It is an object of the present invention to provide an alternative method and a communication device by means of which echoes can be cancelled in an easy-to-implement way and in a way which allows flexible and programmable adjustments to a variety of national authority communication line requirements.

To achieve this, the present invention is characterized in that the echo-control signal is an echo digital control signal which is digital-to-analog converted and then supplied to the receiving path.

Although the proposed invention seems more complicated because of the inclusion of a digital-to-analog convertor (DAC) apart from the generally already present further A/D and D/A convertors in the receiving and sending paths, respectively, it has surprisingly been found that taking an echo representative control signal from the digital sending path, followed by the digital-to-analog conversion and the addition of the converted control-compensation signal to the receiving path, obviates the above disadvantages without adding substantial complexity to the above-mentioned digital software implemented signal processing and programming.

In order to achieve the above objective the echo compensating means comprise an echo digital control signal generating means, and a digital-to-analog converter coupled to the digital control signal generating means and to the receiving path means for compensating echoes.

In addition to the above advantages, the communication device according to the invention gives rise to a possible limitation of the dynamic range of an ADC which is generally also present in the receiving path of the communication device. This dynamic range is a key factor of such a convertor, and an increase thereof would add to the complexity, required chip area and current consumption in an interface IC for communication purposes. The thus achieved limited dynamic range of said ADC provides opportunities for supplying a lower supply voltage to the communication device, which supply voltage is known to limit the dynamic range at its high end in case of a remote PABX, because it is taken from the telephone line itself. At its lower end the dynamic range is limited by the lowest voltage which does not drown in noise. With the limited dynamic range of the ADC, noise requirements are thus advantageously weakened without jeopardising the overall performance of the communication device according to the invention.

Further embodiment of the communication device according to the invention have the advantage that the proposed inclusion or combination of echo digital control signal generating means and/or receiving filter means in the digital signal processing (DSP) means only causes a small and therefore acceptable increase of the DSP software code and execution time, as well as a minor increase—only necessitating a doubled output register—in DSP hardware.

In the advantageous embodiments of the communication device according to the invention outlined in claims 5 or 6 only one symmetrical digital-to-analog convertor (DAC) is used. This however does not cause a substantial increase in hardware because, for reasons of performance, a symmetrical DAC is preferred anyhow, because of its reduced output noise. Thus, in practise this does not lead to chip area increase or additional current consumption.

The inclusion of a dynamic noise shape (DNS) circuit as proposed in claim 8 only results in a very limited and thus acceptable increase of the chip area in the order of less than 0.05 mm$^2$.

BRIEF DESCRIPTION OF THE DRAWINGS

The method, communication device and radio base station according to the invention will be elucidated further together with the additional advantages, while reference is made to the appended drawing, wherein similar components are referred to by the same reference numerals. In the drawing.

DETAILED DESCRIPTION OF THE INVENTION

Figure 1:
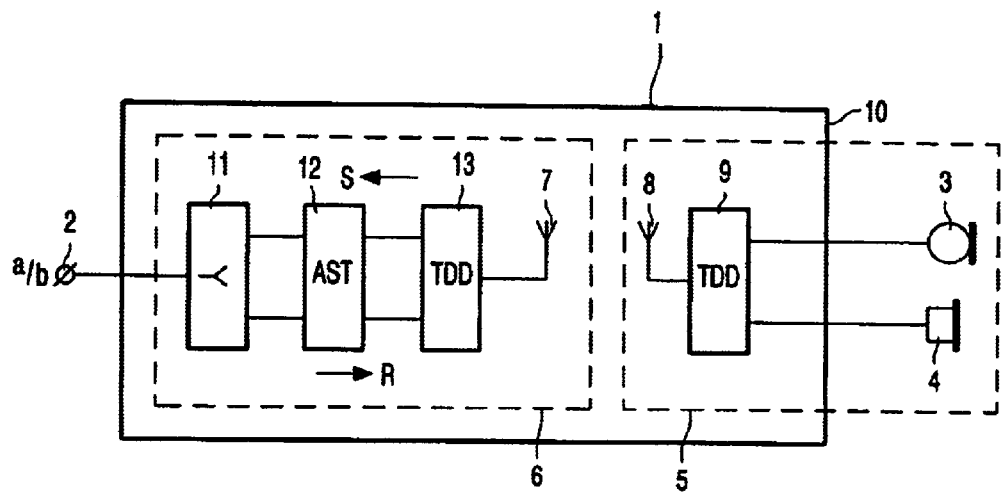
FIG. 1 shows possible arrangements of prior art communication devices.

FIG. 1 shows a communication device 1, such as a telephone, which is connected to a communication line 2, such as the well known a/b telephone line. The communication device 1 usually has a low frequency data source, for example a microphone 3, facsimile or the like, and a telephone or loudspeaker 4. Data is thus transferred between the communication line 2 and the communication device 1. The communication device 1 may be mobile, portable or cordless. In the case of for example a cordless communication device 1, the device has a portable part 5 and a base station 6, mutually communicating through antennas 7 and 8. In general the microphone 3 and loudspeaker 4 are connected to the communication line 2 through a line interface 10. The integrated circuit PCA 1070 mentioned earlier contains circuitry like interface 10 and in particular an analog echo cancelling means, also called analog anti-sidetone circuit AST, for cancelling echoes caused by a hybrid 11 included in the interface 10.

Figure 2:
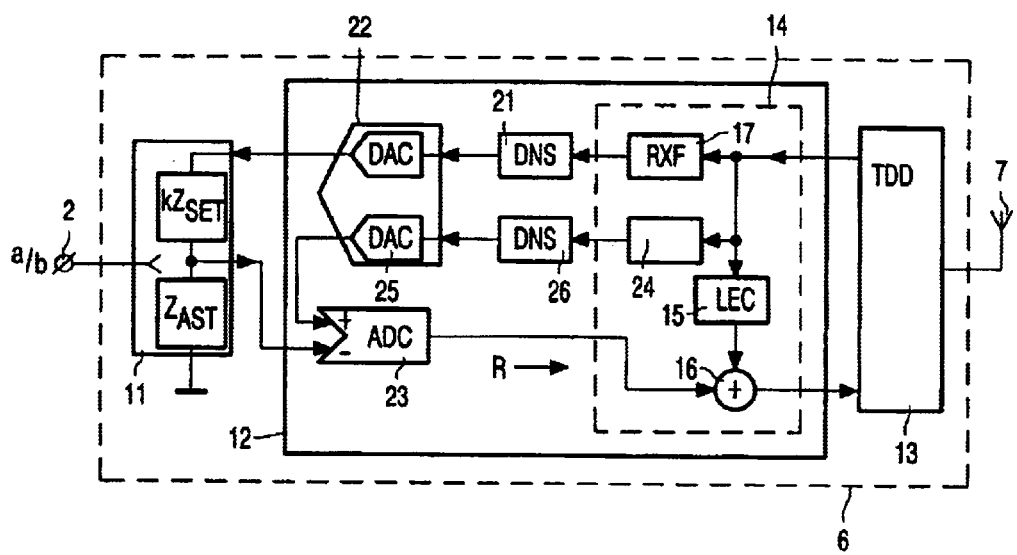
FIG. 2 shows a possible embodiment of the communication device according to the invention.
Figure 4A:
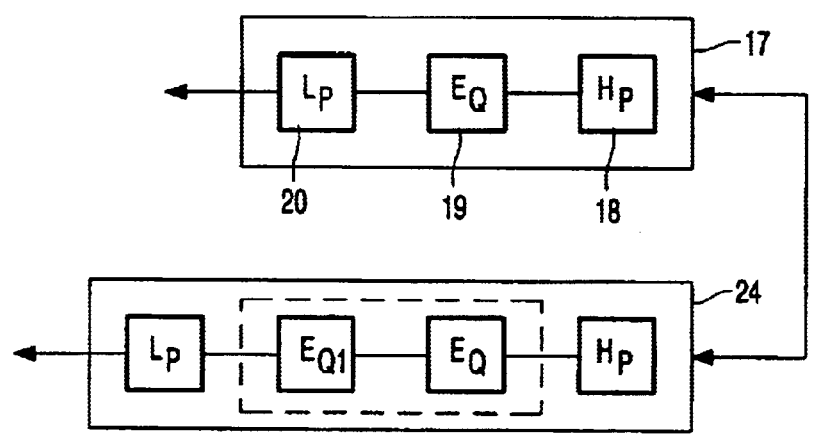
FIGS. 4A and 4B show possible and optimised connection schemes respectively for incorporating the simulated key impedances in the communication device according to the invention.

FIG. 2 shows an embodiment of a part of the communication device 1, in particular the part included in the base station 6 is exemplified. The base station 6 comprises the line interface 10 containing the hybrid 11 and several separate discrete electrical components, a usually on-chip circuit 12 connected to the interface 10, and a time division duplex (TDD) circuit 13 connected between the circuit 12 and the antenna 7. The portable part 5 also contains a TDD circuit 9 meant for sending signals to and receiving signals from the base station 6. Viewed schematically, the communication device 1 has a sending path S from microphone 3 to at least a/b line 2, and a receiving path R from at least a/b line 2 to loudspeaker 4. This path distinction can also be made in circuit 12. The circuit 12 contains a digital signal processing circuit, or DSP 14 for short. The DSP 14 usually comprises a digital local echo canceller (LEC) 15, which like the analog AST mentioned above is coupled between the sending path S and the receiving path R. The DSP 14 digitally cancels or compensates echoes originating from local hybrids present in the communication device 1. The hybrid calls for echo compensation, cancellation or anti-sidetone technics. These technics develop a control signal or echo compensation signal from the sending path S, which is representative of an echo experienced in the communication device 1. Such a control signal is then inverted and added to the signal in the receiving path R in order to compensate for the echo and supply a return signal to the loudspeaker 4 which is virtually free of the echo compensated for. Local echoes originating from the communication device 1 itself and arising on a moderate timescale of approximately up to 5 msec are compensated for either in an analog way in the (AST) line interface 11 or digitally in the LEC 15. For this purpose, transceiver 13 outputs a digital signal in the S-path to DSP 14 and receives a digital signal sent by a communication device at the other end of the line 2 through DSP 14. DSP 14 comprises the LEC 15, which generates a digital representation of an echo and adds it, inverted in an adder 16, to the digital return signal in the R-path. DSP 14 further comprises a receiving filter means (RXF) 17 containing as shown in FIG. 4, a series arrangement of a highpass filter 18, digital filter means 19 and a lowpass filter 20 for filtering out the unwanted spectral lobes of the output signal. The implementation and functioning of the receiving filter means 17 is known per se in the relevant art. The filter means output signal is then fed to a digital noise shape (DNS) circuit 21 and digital-to-analog converted in DAC means 22 so as to be provided to line interface 11. The signal in the R-path from interface 11 is fed to a minus input and then analog-to-digital converted in ADC 23, which in turn is connected to adder 16.

Alternative echo compensation is provided for in DSP 14 by digital signal means 24 for generating a digital echo signal, which is coupled to a second DAC 25, included in the DAC means 22. Optionally a second digital noise shape circuit 26 is connected between the means 24 and DAC 25. DAC 25 has an output 27 connected to a plus input of ADC 23. The digital signal means 24 is designed and arranged to generate an echo signal to compensate for an echo originating from the communication device at the other end of the a/b line 2.

Because ADC input signals are input into plus and minus inputs of the ADC 23 its dynamic range is limited. The merits thereof are such that they largely offset the disadvantages of the presence of the second DAC 25 and its optional DNS circuit 26. However since DAC means 22 are symmetrical, the second DAC 25 is given for free, as it is implicitly present anyhow. The optional DNS 26 on the other hand costs only a very limited chip area in practise.

Figure 3:
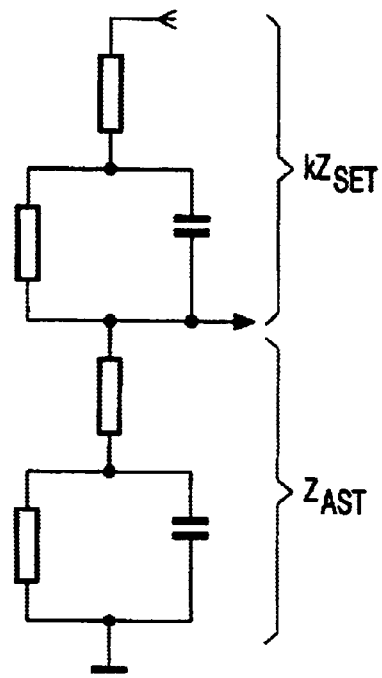
FIG. 3 shows a possible arrangement of key impedances simulated in the communication device according to the invention.

In addition, the receiving filter means 17 and the echo digital control signal generating means 24 can be combined to save memory space both for programming and data handling in the digital signal processing means 14. Further advantages can be achieved as follows. The communication device 1 contains key impedances which are vital to match the internal impedance of the communication device 1 for each and every country with the locally present line impedance and to match an internal echo cancelling impedance with an impedance reflecting the echo properties at the specific location of the communication device 1. These impedances ($kZ_{SET}$, $Z_{AST}$), that are all variable (resistors R1 . . . R4, and capacitors C1, C2) in order to be able to adjust their values to the above mentioned requirements, are schematically shown in FIG. 3. Given the notion of the present invention, inclusion of these key impedances by simulating them in the DSP 14 is proposed. Digital simulation provides on-chip flexibility and programmability of the key impedances as well as easy on-chip integration. Given a transfer function H(s) in terms of the Laplace operator of the circuit of FIG. 3, this transfer function can easily be transformed by bi-linear mapping of H(s) into the well known z-domain. This yields H(z) in terms of the z-operator, which is realised by adding EQ1 after EQ to the digital filter circuit of FIG. 4A. By properly identifying the variable coefficients in the second order digital filter function with the resistance and capacitor values, digital simulation thereof is achieved. This solution is easier to realise than building the variable programmable key impedances on-chip, for example by means of switched capacitor circuits.

Figure 4B:
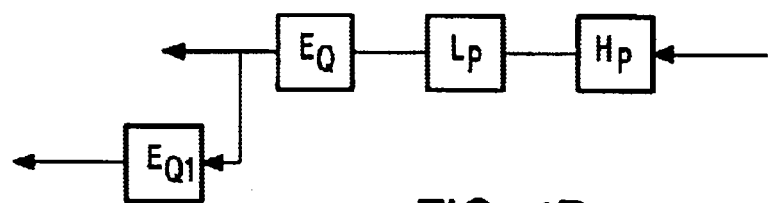

FIG. 4B shows a combined connection scheme for the RXF 17 and the digital signal means 24, where EQ1 is divided out. This saves program memory space and reduces the number of instructions to be executed in DSP 14.

In principle, means (not shown) can now be provided for automatically measuring local electrical subscriber line conditions and characteristics on a/b line 2 for adapting the simulated key impedances such that they automatically reflect an optimum matching to line impedance and/or provide optimum echo cancelling on the spot. These conditions are line voltage, line current, impedance behaviour as a function of frequency, echo impulse response etcetera. These conditions thus provide data for automatically calculating the optimum values for the simulated components, schematically shown in FIG. 3.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A communication device for canceling echoes in the communication device, comprising:

receiving path means and sending path means for receiving and sending respective signals, the receive path means comprising an analog-to-digital converter having a negative input terminal coupled to receive an input signal from a telephone line interface;

first echo compensating means coupled between the receiving path means and the sending path means for canceling local echoes; and second echo compensating means for generating an echo control signal representative of a perceived echo, the echo compensating means coupled to the sending path means and the receiving path means, and comprising an echo digital control signal generating means, and a digital-to-analog converter coupled to the digital control signal generating means and to the receiving path means for compensating echoes;

wherein the digital-to-analog converter has an output terminal that is directly connected to positive input terminal of the analog-to-digital-converter, such that the dynamic range of the analog-to-digital converter is limited.

2. The communication device according to claim 1, characterized in that the communication device comprises a digital signal processing means incorporating a digitally implemented part of the receiving path means and/or the sending path means, and in that the echo digital control signal generating means is also incorporated in the digital signal processing means.

3. The communication device according to claim 2, characterized in that the digital signal processing means includes a receiving filter means.

4. The communication device according to claim 3, characterized in that the receiving filter means and the echo digital control signal generating means are combined in the digital signal processing means.

5. The communication device according to claim 4, characterized in that the communication device comprises an arrangement of two key impedances, one key impedance being representative of an internal impedance of the communication device and the other being representative of echo capabilities, which key impedances are digitally simulated in the digital signal processing means.

6. The communication device according to claim 5, characterized in that the communication device comprises means for automatically measuring local electrical subscriber line conditions and characteristics for adapting said values such that they automatically reflect an optimum matching to line impedance and/or provide optimum echo cancelling.

7. The communication device of claim 1, characterized in that the communication device comprises a second digital-to-analog converter which is combined with the digital-to-analog converter coupled to the echo digital control signal generating means to form a single symmetrical digital-to-analog converter.

8. The communication device of claim 1, wherein the communication device is disposed within a radio base station of a cordless telephone for canceling echoes in the cordless telephone.

9. The communication device of claim 1, wherein the digital-to-analog converter is coupled to an add input terminal of the analog-to-digital converter, and a hybrid line interface is coupled to a subtract input terminal of the analog-to-digital converter.

* * * * *